US011007509B2

(12) United States Patent
Mestl et al.

(10) Patent No.: US 11,007,509 B2
(45) Date of Patent: May 18, 2021

(54) METHOD FOR PRODUCING MIXED OXIDE MATERIALS CONTAINING MOLYBDENUM

(71) Applicant: Clariant Produkte (Deutschland) GmbH, Frankfurt am Main (DE)

(72) Inventors: Gerhard Mestl, Munich (DE); Klaus Wanninger, Kolbermoor (DE); Silvia Neumann, Großkarolinenfeld (DE)

(73) Assignee: CLARIANT PRODUCKTE GMBH, Frankfurt am Main (DE)

( * ) Notice: Subject to any disclaimer, the term of this patent is extended or adjusted under 35 U.S.C. 154(b) by 0 days.

(21) Appl. No.: 16/480,002

(22) PCT Filed: Jan. 26, 2018

(86) PCT No.: PCT/EP2018/052010
§ 371 (c)(1),
(2) Date: Jul. 23, 2019

(87) PCT Pub. No.: WO2018/141651
PCT Pub. Date: Aug. 9, 2018

(65) Prior Publication Data
US 2019/0366311 A1 Dec. 5, 2019

(30) Foreign Application Priority Data
Jan. 31, 2017 (DE) ......................... 102017000848.5

(51) Int. Cl.
*B01J 27/057* (2006.01)
*B01J 37/02* (2006.01)
(Continued)

(52) U.S. Cl.
CPC ....... *B01J 27/0576* (2013.01); *B01J 37/0236* (2013.01); *B01J 37/033* (2013.01);
(Continued)

(58) Field of Classification Search
CPC . B01J 23/22; B01J 23/002; B01J 23/20; B01J 23/28; B01J 27/00576; B01J 35/002;
(Continued)

(56) References Cited

U.S. PATENT DOCUMENTS 3,637,526 A 1/1972 Levy
5,281,745 A 1/1994 Ushikubo
(Continued)

FOREIGN PATENT DOCUMENTS

EP 0318295 5/1989
EP 1598112 11/2005
(Continued)

OTHER PUBLICATIONS

Desanto, Peter, Structural aspects of the M1 and M2 phases ... Z. Kristallogr. 219 (2004) 152-165.
(Continued)

*Primary Examiner* — Patricia L. Hailey

(57) ABSTRACT

A simple, scalable, inexpensive, and reproducible method of selectively preparing the M1 phase of a MoVNbTe mixed oxide in a hydrothermal synthesis using tellurium dioxide is disclosed which can utilize inexpensive metal oxides as starting compounds.

14 Claims, 9 Drawing Sheets

Figure 1:
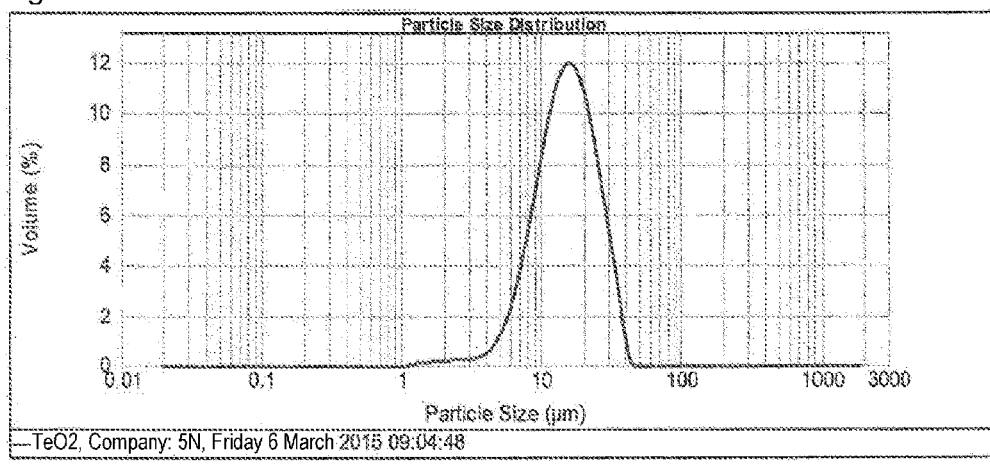

(51) Int. Cl.
*B01J 37/03* (2006.01)
*B01J 37/04* (2006.01)
*C01B 19/00* (2006.01)
*B01J 23/22* (2006.01)
*B01J 23/20* (2006.01)
*B01J 23/28* (2006.01)
*B01J 35/02* (2006.01)
*B01J 35/00* (2006.01)

(52) U.S. Cl.
CPC ............. *B01J 37/04* (2013.01); *C01B 19/002* (2013.01); *B01J 23/20* (2013.01); *B01J 23/22* (2013.01); *B01J 23/28* (2013.01); *B01J 35/002* (2013.01); *B01J 35/006* (2013.01); *B01J 35/023* (2013.01); *C01P 2002/72* (2013.01); *C01P 2002/74* (2013.01); *C01P 2004/52* (2013.01); *C01P 2004/61* (2013.01)

(58) Field of Classification Search
CPC .... B01J 35/006; B01J 35/023; B01J 2523/55; B01J 2523/56; B01J 2523/64; B01J 2523/68; C01P 2004/61; C01P 2002/72
USPC .......................................... 502/215, 311, 312
See application file for complete search history.

(56) References Cited

U.S. PATENT DOCUMENTS

| | | | |
|---|---|---|---|
| 5,380,933 A | 1/1995 | Ushikubo | |
| 5,422,328 A * | 6/1995 | Ushikubo | B01J 23/28 502/309 |
| 5,616,815 A * | 4/1997 | Atkins | B01J 27/188 568/700 |
| 6,867,328 B2 | 3/2005 | Borgmeier | |
| 7,009,075 B2 | 3/2006 | Hazin | |
| 7,038,082 B2 | 5/2006 | Borgmeier | |
| 7,053,022 B2 | 5/2006 | Gaffney | |
| 7,375,052 B2 * | 5/2008 | Tu | B01J 23/002 502/305 |
| 7,473,666 B2 * | 1/2009 | Yanagi | B01J 23/002 502/233 |
| 9,073,036 B2 | 7/2015 | Hagemeyer | |
| 2003/0088118 A1 * | 5/2003 | Komada | C07C 253/24 558/332 |
| 2003/0187299 A1 * | 10/2003 | Machhammer | C07C 51/252 562/547 |
| 2004/0063990 A1 * | 4/2004 | Gaffney | C07C 51/215 558/322 |
| 2004/0082190 A1 * | 4/2004 | Borgmeier | B01J 27/0576 438/722 |
| 2008/0200716 A1 * | 8/2008 | Lugmair | B01J 27/0576 558/319 |
| 2010/0255985 A1 * | 10/2010 | Gaffney | C07C 5/48 502/312 |
| 2010/0255986 A1 * | 10/2010 | Gaffney | B01J 37/0036 502/312 |
| 2010/0256432 A1 * | 10/2010 | Arnold | C07C 5/48 585/655 |
| 2015/0119622 A1 * | 4/2015 | De Rooij | B01J 23/002 585/658 |
| 2016/0038922 A1 * | 2/2016 | De Room | B01J 37/08 585/658 |
| 2019/0240647 A1 * | 8/2019 | Gao | B01J 23/22 |
| 2019/0366311 A1 * | 12/2019 | Mestl | B01J 37/036 |
| 2020/0061583 A1 * | 2/2020 | Mestl | B01J 37/033 |
| 2020/0139349 A1 * | 5/2020 | Mestl | B01J 23/28 |
| 2020/0215516 A1 * | 7/2020 | Mestl | B01J 35/1019 |
| 2020/0290026 A1 * | 9/2020 | Mestl | B01J 37/04 |

FOREIGN PATENT DOCUMENTS

| | | | |
|---|---|---|---|
| JP | S58140308 | 8/1983 | |
| JP | H06321609 | 11/1994 | |
| JP | 07232071 | 9/1995 | |
| JP | 08226796 | 9/1996 | |
| JP | 2000143244 | 5/2000 | |
| JP | 2001058827 | 3/2001 | |
| WO | WO-2008152952 A1 * | 12/2008 | .......... B01J 23/8885 |
| WO | 2009106474 | 9/2009 | |

OTHER PUBLICATIONS

Valente, Jamie S., Chemical, Structural, and Morphological Changes of a MoVTeNb catalyst . . . ACS Catal. 4, (2014) 1292-1301.
Sanfiz, A. Celaya, Preparation of Phase-Pure M1 MoVTeNb Oxide . . . Top. Catal. 50, (2008) 9-32.
Ushikubo, Takashi Ammoxidation of propane over Mo—V—Nb—Te mixed oxide catalysts, Studies in Surface Science and Catalysis 112 (1997) 473-480.
P. Botella, Solid State Science 7.

* cited by examiner

METHOD FOR PRODUCING MIXED OXIDE MATERIALS CONTAINING MOLYBDENUM

The invention relates to a method for preparing mixed-oxide materials.

MoVNbTe mixed oxides for the oxidation of propane to acrylic acid or for the oxidative dehydrogenation of ethane to ethene are prior art. Catalysts based on MoVNbTe mixed oxides are the subject of over 200 patents and numerous scientific publications. The promotion of these mixed oxides with other metals of the periodic table is known. The highest acrylic acid yields described to date with such systems are about 60% and the highest ethene yields about 80%.

The four-element MoVNbTe basic system for a catalyst was first proposed by Mitsubishi for the ammoxidation of propane to acrylonitrile (1989, EP 318295 A1) and oxidation to acrylic acid (1994, EP 608838, A2). JP H07-053414 (Mitsubishi) also describes the oxidative dehydrogenation of ethane to ethylene with this type of catalyst.

MoVNbTe mixed oxides consist primarily of two orthorhombic phases, termed "M1" and "M2" (T. Ushikubo, K. Oshima, A. Kayou, M. Hatano, Studies in Surface Science and Catalysis 112, (1997), 473). The major role in selective oxidation reactions appears to be played by the M1 phase.

According to P. de Santo et al., Z. Kristallogr. 219 (2004) 152, the principal phases M1 and M2 in MoVNbTe mixed oxides for the selective oxidation can be described, by way of example, by the following molecular formulas:

M1: $Mo_1V_{0.15}Te_{0.12}Nb_{0.128}O_{3.7}$ or $Mo_{7.8}V_{1.2}Te_{0.937}Nb_1O_{28.9}$

M2: *$Mo_1V_{0.32}Te_{0.42}Nb_{0.08}O_{4.6}$ or $Mo_{4.31}V_{1.36}Te_{1.81}Nb_{0.33}O_{19.81}$

The two main phases can also occur with slightly different stoichiometry. Both vanadium and molybdenum are in the center of an octahedron of oxygen atoms and therefore partly replaceable in the structure, which means that the same structure, for example the M1 phase, is also possible with a higher vanadium content. A detailed investigation of these relationships is given in P. Botella et al., Solid State Science 7 (2005) 507-519. In particular, the M2 phase is inactive in the oxidative dehydrogenation of ethane (see J. S. Valente et al., ACS Catal. 4 (2014), 1292-3101, p. 1293). For the oxidative dehydrogenation of ethane, therefore, a catalyst consisting of the purest possible M1 phase is desirable. The aim is therefore to prepare these crystal phases cleanly and discretely.

EP 529853 A2 discloses a catalyst that is suitable for the preparation of a nitrile from an alkane, wherein the catalyst has the empirical formula $MoV_bTe_cX_xO_n$, in which X is at least one of Nb, Ta, W, Ti, Al, Zr, Cr, Mn, Fe, Ru, Co, Rh, Ni, Pd, Pt, Sb, Bi, B, and Ce, b is 0.01 to 1.0, c is 0.01 to 1.0, x is 0.01 to 1.0, and n is the number that satisfies the overall valency of the metal elements, with the catalyst showing X-ray diffraction peaks in its X-ray diffraction pattern at the following 2θ angles: diffraction angles at 2θ: 22.1°±0.3°, 28.2°±0.30, 36.2°±0.30, 45.2°±0.30, 50.0°±0.3°.

JP H07-232071 discloses a catalytic method of preparing a nitrile at relatively low temperature and in high yield using an alkane as raw material and a particular catalyst. The main component of the catalyst is a mixed-metal oxide of molybdenum, vanadium, tellurium, oxygen, and X (X is one or more elements selected from the group of niobium, tantalum, etc.), wherein the ratio of the main components, i.e. not including oxygen, is expressed by the formulas I to IV: I) 0.25<rMo<0.98, II) 0.003<rV<0.50, III) 0.003<rTe<0.50, IV) 0<rX<0.5 (rMo, rV, rTe, and rX are in each case the molar parts of molybdenum, vanadium, tellurium, and X) and in XRD shows XRD bands for this mixed oxide at the different 2θ angles 9.0°±0.3°, 22.1°±0.30, 27.3°±0.3°, 29.2°±0.3°, and 35.4°±0.3°. With this method, a nitrile may be prepared at low temperature in high yield without the presence of a halogenated substance in the reaction system, by reaction of an alkane for example with water etc.

Other successful attempts at preparing a pure M1 phase are based on dissolving the M2 phase out of the phase mixture. These attempts are described for example in EP 1301457 A2, EP 1558569 A1 or WO 2009/106474 A2.

A. C. Sanfiz et al., Top. Catal. 50 (2008) 19-32, describe hydrothermal syntheses of MoVNbTe oxide. These syntheses are executed exclusively from soluble compounds. The soluble tellurium compound that is normally used is telluric acid $Te(OH)_6$. In the most commonplace oxidic tellurium compound $TeO_2$, tellurium is in oxidation state +4. Unfortunately, tellurium dioxide ($TeO_2$) is poorly soluble in water. In telluric acid, tellurium is however in the oxidation state +6. Thus, for the preparation of telluric acid, tellurium needs to be oxidized to a higher oxidation state. The usual synthesis is achieved by oxidation of tellurium oxide with hydrogen peroxide, which on a large scale is associated with safety problems, as hydrogen peroxide can undergo disproportionation with spontaneous decomposition to water and oxygen. This means that tellurium oxide can be prepared in large quantities only with difficulty.

Watanabe (Applied Catal. A General, 194-195 (2000) 479-485) describes inter alia the hydrothermal synthesis from the sparingly soluble precursors $MoO_3$, $V_2O_5$, and $TeO_2$. The hydrothermal synthesis yields a precursor for an ammoxidation catalyst that, after calcining, has activity twice as high as that of a catalyst prepared by the known dry method. The mixed oxides produced by the solid-state reaction show fairly low activity. It was suggested that the higher activity of the catalyst prepared by hydrothermal synthesis is associated primarily with the higher surface area.

Synthesis of the MoVNbTe mixed oxide without using telluric acid has the potential for considerable cost savings.

The Nb component used in the synthesis of MoVNbTe mixed oxides is normally ammonium niobium oxalate. Niobium oxide, on the other hand, is poorly soluble and therefore has only limited suitability as a starting compound.

What is desirable is a method of synthesis that provides a clean M1 phase of a MoVNbTe mixed oxide and works with inexpensive starting compounds, i.e. with simple metal oxides, for example molybdenum trioxide, vanadium pentoxide, niobium pentoxide, and tellurium dioxide.

The object of the present invention was therefore to find a simple, scalable, inexpensive, and reproducible method of selectively preparing the M1 phase of a MoVNbTe mixed oxide in a hydrothermal synthesis using tellurium dioxide and, if possible, also using inexpensive metal oxides as starting compounds.

The object is achieved by a method for preparing a mixed-oxide material containing the elements molybdenum, vanadium, niobium, and tellurium ("MoVNbTe mixed oxide") comprising the following steps:

a) preparation of a mixture of starting compounds that contains molybdenum, vanadium, niobium, and a tellurium-containing starting compound in which tellurium is in oxidation state +4, b) hydrothermal treatment of the mixture of starting compounds at a temperature of 100° C. to 300° C. to obtain a product suspension, c) separation and drying of the solid from the product suspension resulting from step b), d) activation of the solid in inert gas to obtain the mixed-oxide material, characterized in that the tellurium-containing starting compound has a particle size $D_{90}$ smaller than 100 µm.

The method according to the present invention results in a mixed-oxide material that is a MoVNbTe mixed oxide and is suitable for use as a catalyst material.

When using for example tellurium dioxide with larger particles, it was found that the synthesis proceeds only incompletely, even if the other components are soluble metal compounds. The product cannot be filtered and contains many unreacted nanoparticles. These are presumably molybdenum-vanadium oxometalates which, as salts with very large anions, are no longer dissolved, but are present as fine nanoparticles that cannot be filtered.

However, if for example tellurium dioxide that has a particle size with a $D_{90}<100$ µm is used for the synthesis, the formation of the desired phase proceeds almost completely.

According to the present invention, the tellurium-containing starting compound used has a particle size with a $D_{90}<100$ µm, preferably $D_{90}<75$ µm, more preferably $D_{90}<50$ µm. Optionally, the tellurium dioxide used may have a particle size $D_{50}<50$ µm or $<35$ µm.

In addition, the niobium-containing starting compound, which is preferably niobium oxide, may likewise have a particle size with a $D_{90}<100$ µm, preferably $D_{90}<75$ µm, more preferably $D_{90}<50$ µm. Optionally, the niobium-containing starting compound used, which is preferably niobium oxide, may have a particle size $D_{50<50}$ µm or $<35$ µm.

In addition, all starting compounds used may have a particle size with a $D_{90}<100$ µm, preferably $D_{90}<75$ µm, more preferably $D_{90}<50$ µm. Optionally, the starting compounds may have a particle size $D_{50}<50$ µm or $<35$ µm.

The starting compounds used, for example metal oxides such as tellurium dioxide, are powders and exhibit a particle size distribution. The particle size $D_{90}$ is defined as the particle diameter threshold in the particle size distribution below which 90% of all particles are found. The particle size of the meridian, i.e. the particle size below which half of all particles in the particle size distribution are found, is likewise termed particle size $D_{50}$. It is considered more preferable that the particle size $D_{50}$ for the tellurium dioxide used as the starting compound is below 35 µm.

The desired particle size $D_{90}$ or $D_{50}$ of the starting compound may be obtained by starting with a powder with a coarser particle size distribution and comminuting the particles mechanically. This may be done by milling, for which all suitable means familiar to a person skilled in the art may be employed, for example hammer mills, planetary mills, mortars, etc.

The starting compounds are the molybdenum-, vanadium-, niobium-, and tellurium-containing reactants for the hydrothermal synthesis (precursor compounds). These contain respectively one or more of the elements molybdenum, vanadium, niobium, or tellurium.

The molybdenum-containing starting compound may be for example an ammonium heptamolybdate or molybdenum trioxide, the vanadium-containing starting compound may be for example ammonium metavanadate, vanadyl sulfate or vanadium pentoxide, the niobium-containing starting compound may be for example ammonium niobium oxalate, niobium oxalate or niobium oxide. The tellurium-containing starting compound according to the present invention is one in which tellurium is present in oxidation state +4, i.e. as tellurium(IV) cation, such as in tellurium dioxide or in a compound of formula $M_x^{n+}TeO_3$ (where n=1 or 2 and x=2/n), wherein M is an alkali metal or alkaline earth metal, for example $Na_2TeO_3$. More preferably, the tellurium-containing starting compound is tellurium dioxide, which may be present in any degree of hydration.

The possible stoichiometry of the M1 phase is adequately known from the literature and may be given by the formula $Mo_1V_aTe_bX_cO_x$, where a=0.2 to 0.3, b=0.1 to 0.25, c=0.1 to 0.2, and x, depending on the oxidation state of the metals (Mo, V, Te, and Nb), is the value needed to counterbalance the charge.

The mixture of starting compounds is preferably an aqueous suspension and is treated hydrothermally. The term "hydrothermal" refers to the reaction conditions for preparing a catalyst material in the presence of water and at elevated temperature and/or elevated pressure, for example in an autoclave. The pressure for this may be in the range from 5 to 30 bar, preferably from 10 to 27 bar. Pressure ranges, by way of example, are 11 to 15 bar or approximately 17 bar and 22 to 25 bar.

The hydrothermal treatment (step b)) yields a product suspension that contains the product as a solid. In the method according to the present invention, the separation of the solid in the product suspension in step c) may be carried out in one or more filtration steps, for example through filtration from the mother liquor. Drying may be carried out in a single step or in two steps in an air stream or in static air. In this process, the first drying step is carried out preferably at 60 to 150° C. (more preferably at 80 to 120° C.) and the second drying step at 200 to 350° C. (more preferably at 220° C. to 280° C.). In addition, step c) of the method according to the present invention may include one or more of the following steps: washing, drying, calcining, and/or milling. Calcining may be carried out in air at 200 to 500° C., preferably 250° C. to 350° C.

After drying of the filtrate in step c), the dried mixture is activated for example in an inert gas stream or static inert gas atmosphere at approximately 500 to 700° C. for at least 1 hour (step d). As the inert gas, nitrogen, helium or argon are particularly suitable. Activation is carried out preferably in the range from 550° C. to 650° C. For example, activation may be carried out at approximately 600° C. for approximately 2 hours.

The resulting MoVNbTe mixed oxide may be used as catalyst material for the oxidation and/or oxidative dehydrogenation of hydrocarbons, in particular for the selective oxidation of propane to acrylic acid or for the oxidative dehydrogenation of ethane to ethylene. It typically has a BET surface area of 5 to 25 m²/g.

The resulting catalyst material produced by the method according to the present invention may be used in a commercial catalyst in various ways. For example, it may be processed by tableting into catalyst tablets that can then be transferred to a reactor.

The catalyst material may also be processed together with a suitable binder into an extrudate (tablets, molded bodies, honeycombs, and similar). The binder used may be any suitable-seeming binder familiar to a person skilled in the art. Preferred binders include inter alia pseudoboehmite and silicate binders such as colloidal silica or silica sol.

The catalyst material may also be processed together with other components, preferably with a binder, more preferably with an organic binder, for example an organic glue, polymers, resins or waxes, into a washcoat that may be applied to a metallic or ceramic support. Additional impregnation steps or calcination steps may be carried out optionally.

The resulting MoVNbTe mixed oxide is characterized by the following analysis:

The X-ray diffractogram of the MoVNbTe mixed oxide according to the present invention formed by the method according to the present invention shows diffraction reflections h, i, k, and l, which have vertices approximately at the diffraction angles (2θ) 26.2°±0.5° (h), 27.0°±0.5° (l), 7.8°±0.5° (k), and 28.0°±0.5° (l), wherein the intensities $P_h$, $P_i$, $P_k$, $P_l$ of the diffraction reflections h, i, k, and l are able to satisfy the relationships shown below, with $R_x$ (x=1 to 3) as the intensity ratio defined by the relationships:

$R_1 = P_h/(P_h+P_i) > 0.3$, preferably >0.35 and more preferably >0.4; and/or $R_2 = P_i/(P_i+P_l) > 0.5$, preferably >0.6 and more preferably >0.63; and/or $R_3 = P_i/(P_i+P_k) < 0.8$, preferably <0.75, more preferably <0.7.

In the X-ray diffractogram of embodiments of the MoVNbTe mixed oxide obtained, diffraction reflection i may have the second-highest intensity and/or diffraction reflection h may have the third-highest intensity.

The MoVNbTe mixed oxide obtained is used as catalyst material in the examples and in the experimental details is therefore described as catalyst in some cases.

FIG. 1: Particle size distribution of the $TeO_2$ used in example 1 with particle size values $D_{10}=7.625$ μm, $D_{50}=15.140$ μm, $D_{90}=27.409$ μm.

Figure 2:
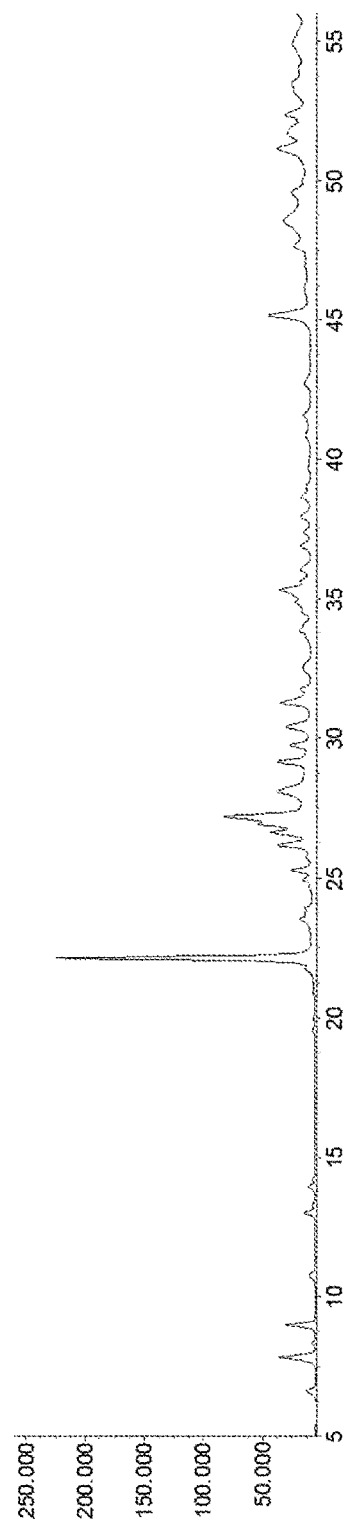

FIG. 2: XRD of the MoVNbTe mixed oxide from example 1.

Figure 3:
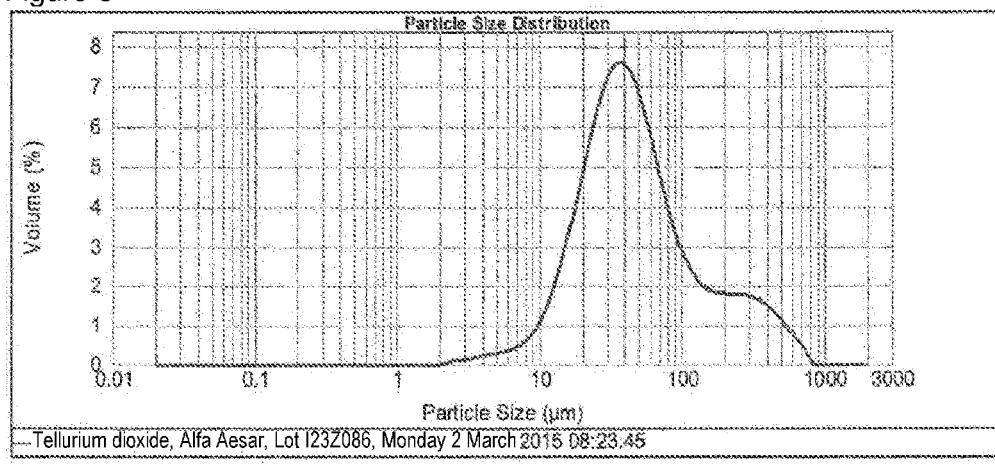

FIG. 3: Particle size distribution of the $TeO_2$ used in comparative example 1 with particle size values $D_{10}=16.45$ μm, $D_{50}=43.46$ μm, $D_{90}=236.48$ μm.

Figure 4:
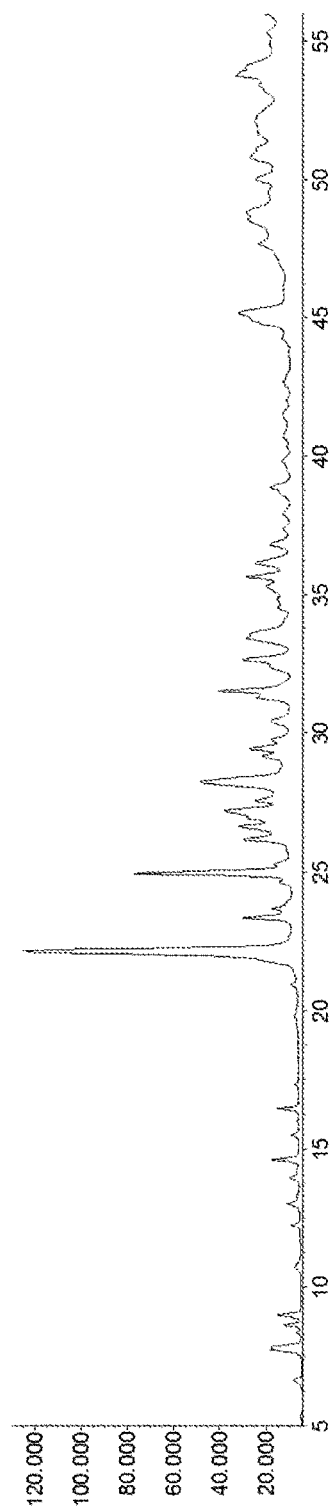

FIG. 4: XRD of the MoVNbTe mixed oxide from comparative example 1.

Figure 5:
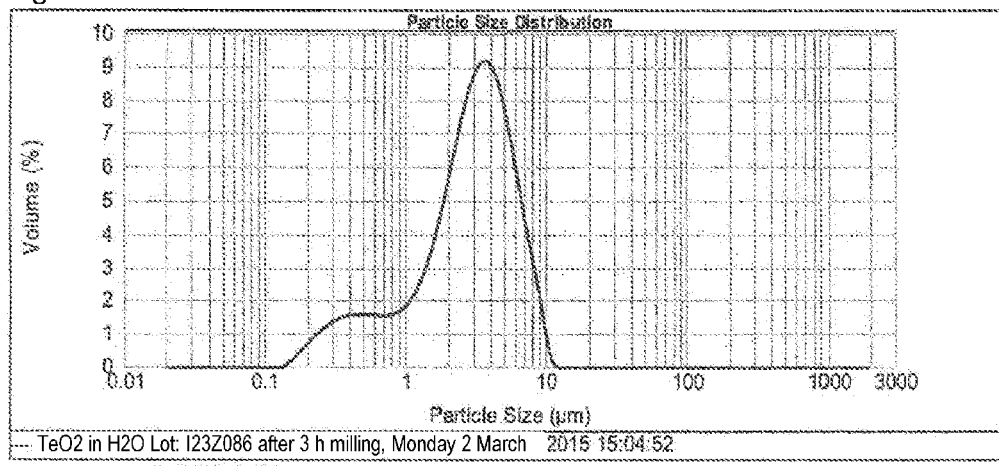

FIG. 5: Particle size distribution of the $TeO_2$ used in example 2.

Figure 6:
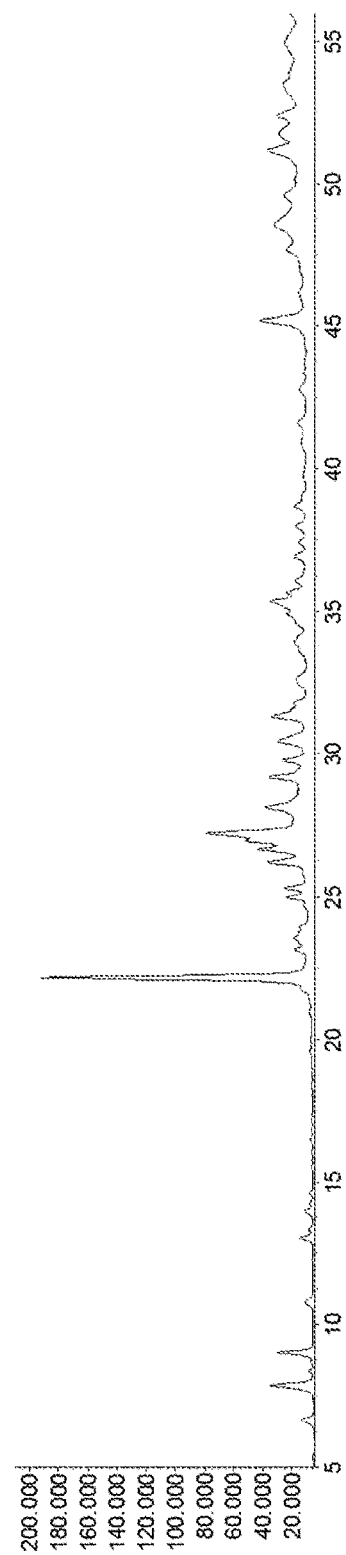

FIG. 6: XRD of the mixed-oxide material from example 2.

Figure 7:
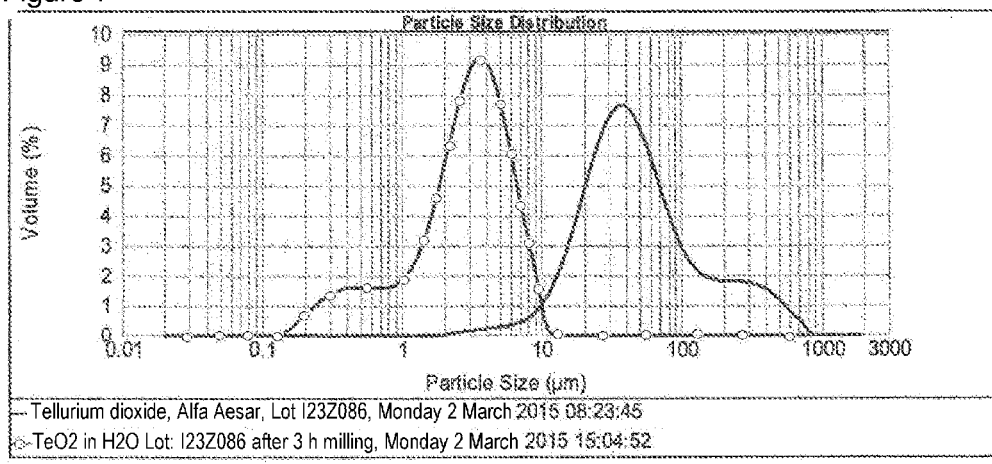

FIG. 7: Comparison of the particle size distribution of the $Nb_2O_5$ used in example 3 before and after milling.

Figure 8:
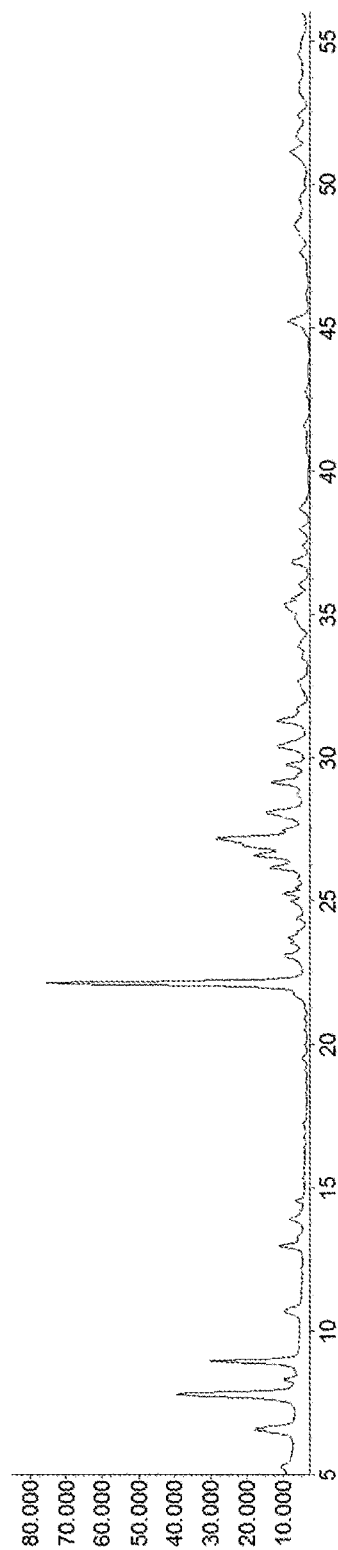

FIG. 8: XRD of the MoVNbTe mixed oxide from example 3.

Figure 9:
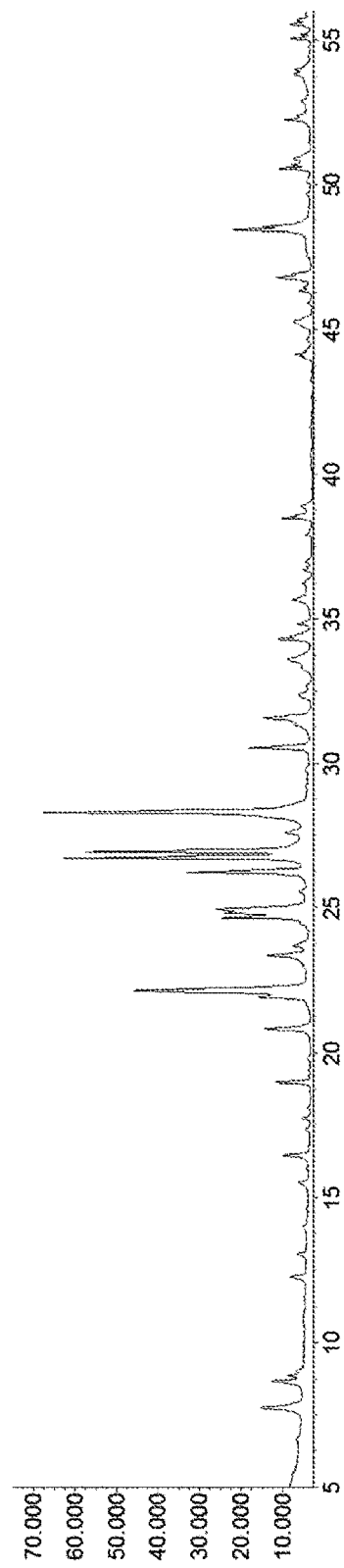

FIG. 9: XRD of the MoVNbTe mixed oxide from comparative example 3.

METHODS OF CHARACTERIZATION

The following methods were used to determine the parameters of the MoVNbTe mixed oxides obtained:

1. BET Surface Area

The determination is carried out according to the BET method described in DIN 66131; the BET method is also published in J. Am. Chem. Soc. 60, 309 (1938). The sample to be determined was dried in a U-shaped quartz reactor at 200° C. under an argon atmosphere (F=50 ml (min) for 1.5 h). The reactor was then cooled to room temperature, evacuated, and immersed in a Dewar vessel of liquid nitrogen. The nitrogen adsorption was carried out at 77 K with an RXM 100 sorption system (Advanced Scientific Design, Inc.).

The BET surface area of the respective MoVNbTe mixed oxide samples was determined on material dried under vacuum at 200° C. The BET surface area data for the MoVNbTe mixed oxide in the present description likewise refer to the BET surface areas of the catalyst material used in each case (dried under vacuum at 200° C.).

2. X-Ray Powder Diffractometry (XRD)

The X-ray diffractogram was obtained by X-ray powder diffractometry (XRD) and analyzed according to the Scherrer formula. The XRD spectra were measured on the catalyst materials activated in nitrogen at 600° C. Measurements were obtained on a Philips PW 3710-based PW 1050 Bragg-Brentano parafocusing goniometer at 40 kV and 35 mA using Cu-Kα radiation (wavelength=0.15418 nm), a graphite monochromator, and a proportional counter. The XRD scans were digitally recorded in increments of 0.04° (2 theta, 2θ). SiC was added as internal standard for phase quantification. Approximately 5% SiC was added for this, but the amount was weighed out accurately. This amount is stated in the phase analyses. Phase analysis was carried out by the Rietveld method using Topas software. The result of this phase analysis is shown in the XRD figures. The exact amount of the desired M1 phase was calculated by relating the proportion of the M1 phase in the total sample (as stated) to the sample without SiC.

3. Particle Size

The particle size distribution was determined by the laser scattering method. This was done using a Malvern Mastersizer 2000. Analysis was according to the Fraunhofer method.

The invention is now explained in more detail on the basis of the embodiments given as examples below, which should not be understood as restrictive.

EMBODIMENTS AS EXAMPLES

Example 1

An autoclave (40 L) was charged with 3.3 L of distilled $H_2O$ and heated to 80° C. with stirring. At the same time, 725.58 g of ammonium heptamolybdate tetrahydrate (from HC Starck) was added and dissolved (AHM solution). Two 5 L beakers each filled with 1.65 L of distilled $H_2O$ were likewise heated to 80° C. with stirring on a temperature-controlled magnetic stirrer. To these beakers was then respectively added and dissolved 405.10 g of vanadyl sulfate hydrate (from GfE, V content 21.2%) and 185.59 g of ammonium niobium oxalate (HC Starck, Nb content: 20.6%) (V solution and Nb solution).

In successive steps, the V solution was pumped into the AHM solution, then 65.59 g of solid $TeO_2$ powder ($TeO_2$ of 5N+ particle size distribution, see FIG. 1) and 1.65 L of distilled $H_2O$ were added, stirring was continued for 1 h at 80° C., and finally the Nb solution was pumped into the AHM solution using a peristaltic pump. Pumping time: V solution: 4.5 min at 190 rpm (tubing diameter: 8×5 mm), Nb solution: 6 min at 130 rpm (tubing diameter: 8×5 mm).

The resulting suspension was stirred for a further 10 min at 80° C. The stirrer speed during the precipitation was 90 rpm.

The suspension was then blanketed with nitrogen by pressurizing with nitrogen in the autoclave to a pressure of approximately 6 bar and opening the bleed valve so far that the autoclave was flushed under pressure with $N_2$ (5 min). Finally, the pressure was released through the vent valve to a residual pressure of 1 bar.

The hydrothermal synthesis in the 40 L autoclave was carried out at 175° C. for 20 h (heating time: 3 h) using an anchor stirrer at a stirrer speed of 90 rpm.

After the synthesis, the solid was filtered off with the aid of a vacuum pump using a blue ribbon filter and the filter cake was washed with 5 L of distilled H20.

The solid was dried at 80° C. in a drying oven for 3 days and then milled in a hammer mill, resulting in a yield of 0.8 kg of solid.

Calcination was carried out at 280° C. for 4 h in an air stream (heating rate 5° C./min, air: 1 L/min).

Activation was carried out in a retort at 600° C. for 2 h in an $N_2$ stream (heating rate 5° C./min, $N_2$: 0.5 L/min).

The particle size distribution of the $TeO_2$ used was:
$D_{10}$=7.625 μm $D_{50}$=15.14 μm $D_{90}$=27.409 μm Analytical characterization of the product:
BET=15 $m^2$/g
XRD:

The XRD of the mixed-oxide material from example 1 is shown in FIG. 2 and exhibits the following phase distribution:
M1=90.50%
M2=2.82%
$(Mo_{0.9}V_{1.1})O_5$=1.15%
SiC (standard)=5.53%

Comparative Example 1

An autoclave (40 L) was charged with 6.6 L of distilled $H_2O$ and heated to 80° C. with stirring. At the same time, 1451.16 g of ammonium heptamolybdate tetrahydrate (HC Starck) was added and dissolved (AHM solution). Two 5 L beakers each filled with 3.3 L of distilled $H_2O$ were likewise heated to 80° C. with stirring on a temperature-controlled magnetic stirrer. To these beakers was then respectively added and dissolved 810.21 g of vanadyl sulfate hydrate (GfE, V content 21.2%) and 370.59 g of ammonium niobium oxalate (HC Starck, Nb content: 20.6%) (V solution and Nb solution).

In successive steps, the V solution was pumped into the AHM solution, then 131.18 g of solid $TeO_2$ powder (Alfa Aesar, particle size distribution FIG. 3) and 3.3 L of distilled $H_2O$ were added, stirring was continued for 1 h at 80° C., and finally the Nb solution was pumped into the AHM solution using a peristaltic pump. Pumping time: V solution: 5 min at 290 rpm (tubing diameter: 8×5 mm), Nb solution: 5 min at 275 rpm (tubing diameter: 8×5 mm).

The resulting suspension was now stirred for a further 10 min at 80° C., the stirrer speed during the precipitation was 90 rpm.

The suspension was then blanketed with nitrogen by pressurizing with nitrogen in the autoclave to a pressure of approximately 6 bar and opening the bleed valve so far that the autoclave was flushed under pressure with $N_2$ (5 min). Finally, the pressure was released through the vent valve to a residual pressure of 1 bar.

The hydrothermal synthesis in the 40 L autoclave was carried out at 175° C. for 20 h (heating time: 3 h) using an anchor stirrer at a stirrer speed of 90 rpm.

After the synthesis, the solid was filtered off with the aid of a vacuum pump using a blue ribbon filter and the filter cake was washed with 5 L of distilled $H_2O$. The filtration lasted several days.

The solid was dried at 80° C. in a drying oven for 3 days and then milled in a hammer mill, resulting in a yield of 0.5 kg of solid.

The yield in comparative example 1 is only about half that in the example according to the present invention.

Calcination was carried out at 280° C. for 4 h in an air stream (heating rate 5° C./min, air: 1 L/min).

Activation was carried out in a retort at 600° C. for 2 h in an $N_2$ stream (heating rate 5° C./min, $N_2$: 0.5 L/min).

Particle size values of the $TeO_2$ used:
$D_{10}$=16.45 μm $D_{50}$=43.46 μm $D_{90}$=236.48 μm The XRD of the MoVNbTe mixed oxide from comparative example 1 is shown in FIG. 4 and exhibits the following phase distribution:
M1=51.88%
M2=8.12%
$(Mo_{0.9}V_{1.1})O_5$=12.51%
$(V_{0.35}Mo_{4.65})O_{14}$=23.19%
SiC (standard)=3.59%

Example 2

An autoclave (40 L) was charged with 3.3 L of distilled $H_2O$ and heated to 80° C. with stirring. At the same time, 725.58 g of ammonium heptamolybdate tetrahydrate (HC Starck) was added and dissolved (AHM solution). Two 5 L beakers each filled with 1.65 L of distilled $H_2O$ were likewise heated to 80° C. with stirring on a temperature-controlled magnetic stirrer. To these beakers was then respectively added and dissolved 405.10 g of vanadyl sulfate hydrate (GfE, V content 21.2%) and 185.59 g of ammonium niobium oxalate (HC Starck, Nb content: 20.6%) (V solution and Nb solution).

On the previous day, 65.59 g of $TeO_2$ (Alpha Aesar from comparative example 1) was milled for 3 h in 200 g of distilled $H_2O$ (Retsch PM100 ball mill) and transferred to a beaker with 1.45 L of distilled $H_2O$ (particle size after milling see FIG. 5).

In successive steps, the V solution was pumped into the AHM solution, then the Te suspension milled on the previous day was added, stirring was continued for 1 h at 80° C., and finally the Nb solution was pumped into the AHM solution using a peristaltic pump. Pumping time: V solution: 5 min at 290 rpm (tubing diameter: 8×5 mm), Nb solution: 5 min at 275 rpm (tubing diameter: 8×5 mm).

The resulting suspension was now stirred for a further 10 min at 80° C., the stirrer speed during the precipitation was 90 rpm.

The suspension was then blanketed with nitrogen by pressurizing with nitrogen in the autoclave to a pressure of approximately 6 bar and opening the bleed valve so far that the autoclave was flushed under pressure with $N_2$ (5 min). Finally, the pressure was released through the vent valve to a residual pressure of 1 bar.

The hydrothermal synthesis in the 40 L autoclave was carried out at 175° C. for 20 h (heating time: 3 h) using an anchor stirrer at a stirrer speed of 90 rpm.

After the synthesis, the solid was filtered off with the aid of a vacuum pump using a blue ribbon filter and the filter cake was washed with 5 L of distilled H20.

The solid was dried at 80° C. in a drying oven for 3 days and then milled in a hammer mill, resulting in a yield of 0.8 kg of solid.

Calcination was carried out at 280° C. for 4 h in an air stream (heating rate 5° C./min, air: 1 L/min).

Activation was carried out in a retort at 600° C. for 2 h in an $N_2$ stream (heating rate 5° C./min, $N_2$: 0.5 L/min).

The particle size values of the $TeO_2$ milled for 3 h were:
$D_{10}$=0.569 μm $D_{50}$=2.992 μm $D_{90}$=6.326 μm Analytical characterization of the product:
BET=12 $m^2$/g The XRD of the MoVNbTe mixed oxide from example 2 is shown in FIG. 6 and exhibits the following phase distribution:
M1=86.30%
M2=2.78%
$(Mo_{0.9}V_{1.1})O_5$=0.75%

$(V_{0.35}Mo_{4.65})O_{14}$=3.75%
SiC (standard)=5.01%

Example 3

First, $TeO_2$ (Alpha Aesar from comparative example 1) was slurried in 200 g of distilled $H_2O$ and milled in a ball mill (as in example 2). The portion was then transferred to a beaker with 500 ml of distilled $H_2O$. The $Nb_2O_5$ was slurried in 200 g of distilled $H_2O$ and milled in the same ball mill. A comparison of the particle size distributions before and after milling is shown in FIG. 7.

The portion was then transferred to a beaker with 500 ml of distilled $H_2O$. The next morning it was heated to 80° C., 107.8 g of oxalic acid dihydrate was added to the $Nb_2O_5$ suspension, and the suspension was stirred for approximately 1 h. An autoclave (40 L) was charged with 6 L of distilled H2O and heated to 80° C. with stirring. Once the water had reached temperature, 61.58 g of citric acid, 19.9 g of ethylene glycol, 615.5 g of $MoO_3$ (Sigma Aldrich), 124.5 g of $V_2O_5$, the milled $TeO_2$, and the milled $Nb_2O_5$ in oxalic acid were successively added. 850 ml of distilled $H_2O$ was added to aid transfer and to rinse out the vessels. The total volume of water in the autoclave was 8.25 L and the stirrer speed was 90 rpm. The contents were then blanketed with nitrogen. The hydrothermal synthesis in the 40 L autoclave was carried out at 190° C. for 48 h. After the synthesis, the solid was filtered off with the aid of a vacuum pump using a blue ribbon filter and the filter cake was washed with 5 L of distilled H2O.

The solid was dried at 80° C. in a drying oven for 3 days and then milled in a hammer mill, resulting in a yield of 0.8 kg of solid.

Calcination was carried out at 280° C. for 4 h in an air stream (heating rate 5° C./min, air: 1 L/min).

Activation was carried out in a retort at 600° C. for 2 h in an $N_2$ stream (heating rate 5° C./min, $N_2$: 0.5 L/min).

The XRD of the MoVNbTe mixed oxide from example 3 is shown in FIG. 8 and exhibits the following phase distribution:
M1=85.79%
M2=1.95%
$(Mo_{0.9}V_{1.1})O_5$=1.43%
$MoO_3$=3.31%
$Nb_2O_5$=2.86%
SiC (standard)=4.66%

Comparative Example 2

First, $TeO_2$ (Alfa Aesar from comparative example 1) was slurried in 200 g of distilled $H_2O$ and milled in a ball mill (as in example 2) and then transferred to a beaker with water so that the volume of water in the beaker was 1650 ml.

An autoclave (40 L) was charged with 6.6 L of distilled $H_2O$ and heated to 80° C. with stirring. As soon as the water had reached temperature, 61.58 g of citric acid, 194 g of oxalic acid dihydrate, 19.9 g of ethylene glycol, 615.5 g of $MoO_3$ (Sigma Aldrich), 124.5 g of $V_2O_5$, the milled $TeO_2$, and 56.8 g of $Nb_2O_5$ (unmilled with the particle size distribution from FIG. 7, which also shows particles above 100 μm) were successively added. The contents were then blanketed with nitrogen. The hydrothermal synthesis in the 40 L autoclave was carried out at 190° C. for 48 h. After the synthesis, the solid was filtered off with the aid of a vacuum pump using a blue ribbon filter and the filter cake was washed with 5 L of distilled H2O.

The solid was dried at 80° C. in a drying oven for 3 days and then milled in a hammer mill, resulting in a yield of 0.8 kg of solid.

Calcination was carried out at 280° C. for 4 h in an air stream (heating rate 5° C./min, air: 1 L/min). Activation was carried out in a retort at 600° C. for 2 h in an $N_2$ stream (heating rate 5° C./min, $N_2$: 0.5 L/min).

The XRD of the MoVNbTe mixed oxide from comparative example 3 is shown in FIG. 9 and exhibits the following phase distribution:
M1=17.34%
M2=1.75%
$(V_{0.35}Mo_{4.65})O_{14}$=34.35%
$MoVO_5$=24.57%
$TeMo_6O_{16}$=17.39%
SiC (standard)=4.6%

It can be seen clearly that only 17% of M1 phase was obtained if unmilled niobium oxide that was not reacted first with oxalic acid was used.

The invention claimed is:

1. A method for preparing a mixed-oxide material containing the elements molybdenum, vanadium, niobium, and tellurium, comprising the following steps:
    a) preparation of a mixture of starting compounds that contains molybdenum, vanadium, niobium, and a tellurium-containing starting compound in which tellurium is in oxidation state +4,
    b) hydrothermal treatment of the mixture of starting compounds at a temperature of 100° C. to 300° C. to obtain a product suspension,
    c) separation and drying of the solid from the product suspension resulting from step b),
    d) activation of the solid in inert gas to obtain the mixed-oxide material,
wherein the tellurium-containing starting compound is selected from tellurium dioxide and a compound of formula $M_x^{n+}TeO_3$ in which n=1 or 2 and x=2/n and in which M is an alkali metal or alkaline earth metal, the tellurium-containing starting compound having a particle size $D_{90}$ smaller than 100 μm.

2. The method as claimed in claim 1, wherein the mixture of starting compounds is an aqueous suspension.

3. The method as claimed in claim 1, wherein the tellurium-containing starting compound is tellurium dioxide.

4. The method as claimed in claim 1, wherein one of the starting compounds is ammonium heptamolybdate or molybdenum trioxide.

5. The method as claimed in claim 1, wherein one of the starting compounds is ammonium metavanadate, vanadyl sulfate or vanadium pentoxide.

6. The method as claimed in claim 1, wherein one of the starting compounds is ammonium niobium oxalate, niobium oxalate or niobium oxide.

7. The method as claimed in claim 1, wherein the particle size $D_{50}$ of the tellurium-containing starting compound selected from tellurium dioxide and a compound of formula $M_x^{n+}TeO_3$ is smaller than 35 μm.

8. The method as claimed in claim 1, wherein the particle size $D_{50}$ of the niobium-containing starting compound is smaller than 100 μm.

9. The method as claimed in claim 1, wherein the particle size $D_{50}$ of the starting compounds used is smaller than 50 μm.

10. The method as claimed in claim 1, wherein the tellurium-containing starting compound is a compound of formula $M_x^{n+}TeO_3$ in which n=1 or 2 and x=2/n and in which M is an alkali metal or alkaline earth metal.

11. The method as claimed in claim 1, wherein one of the starting compounds is molybdenum trioxide.

12. The method as claimed in claim 1, wherein one of the starting compounds is vanadium pentoxide.

13. The method as claimed in claim 1, wherein one of the starting compounds is niobium oxide.

14. The method as claimed in claim 1, wherein the product suspension resulting from step b) includes the mixed oxide material, which in the XRD, when using Cu-Kα radiation, has diffraction reflections h, i, k and l whose peaks are at the diffraction angles (2θ) 26.2°±0.5° (h), 27.0°±0.5° (i), 7.8°±0.5° (k) and 28.0°±0.5° (l).

* * * * *